(12) United States Patent
Zhang et al.

(10) Patent No.: US 10,056,822 B1
(45) Date of Patent: Aug. 21, 2018

(54) CONSTANT ON-TIME SWITCHING REGULATOR FOR ZERO ESR OUTPUT CAPACITOR WITHOUT OUTPUT VOLTAGE OFFSET

(71) Applicant: Alpha and Omega Semiconductor (Cayman) Ltd., Grand Cayman (KY)

(72) Inventors: Zhiye Zhang, San Jose, CA (US); Zhinan Wei, San Jose, CA (US)

(73) Assignee: Alpha and Omega Semiconductor (Cayman) Ltd., Grand Cayman (KY)

( * ) Notice: Subject to any disclaimer, the term of this patent is extended or adjusted under 35 U.S.C. 154(b) by 0 days.

(21) Appl. No.: 15/854,567

(22) Filed: Dec. 26, 2017

(51) Int. Cl.
| | |
|---|---|
| *G05F 1/00* | (2006.01) |
| *H02M 1/14* | (2006.01) |
| *H02M 3/158* | (2006.01) |
| *H02M 1/08* | (2006.01) |
| *H02M 1/00* | (2006.01) |

(52) U.S. Cl.
CPC .............. *H02M 1/14* (2013.01); *H02M 1/08* (2013.01); *H02M 3/158* (2013.01); *H02M 2001/0054* (2013.01)

(58) Field of Classification Search
CPC .. H02M 3/158; H02M 3/1588; H02M 3/1582; H02M 2001/0045; H02M 2001/0067
See application file for complete search history.

(56) References Cited

U.S. PATENT DOCUMENTS

| | | | |
|---|---|---|---|
| 7,482,793 B2 | 1/2009 | Stoichita | |
| 8,476,882 B2 | 7/2013 | Luo et al. | |
| 9,467,045 B2 | 10/2016 | Fogg et al. | |
| 9,467,051 B2 | 10/2016 | Stoichita et al. | |
| 2013/0249511 A1* | 9/2013 | Kalje | G05F 1/10 323/271 |

* cited by examiner

*Primary Examiner* — Adolf Berhane
*Assistant Examiner* — Afework Demisse
(74) *Attorney, Agent, or Firm* — Innovation Counsel LLP

(57) ABSTRACT

A control circuit for a switching regulator implementing a fixed frequency constant on-time control scheme incorporates a reference voltage generator to generate a reference voltage ramp that varies over substantially the entire switching period. In one embodiment, the reference voltage increases from an initial voltage value at the start of each switching period towards the end of the switching period and is reset to the initial voltage value at the end of each switching period. The reference voltage ramp ensures stable feedback control operation in the switching regulator without introducing voltage offset for all output voltage values. The control circuit enables the switching regulator to apply constant on-time control scheme while using an output capacitor having any ESR value, including an output capacitor with low or zero ESR.

25 Claims, 6 Drawing Sheets

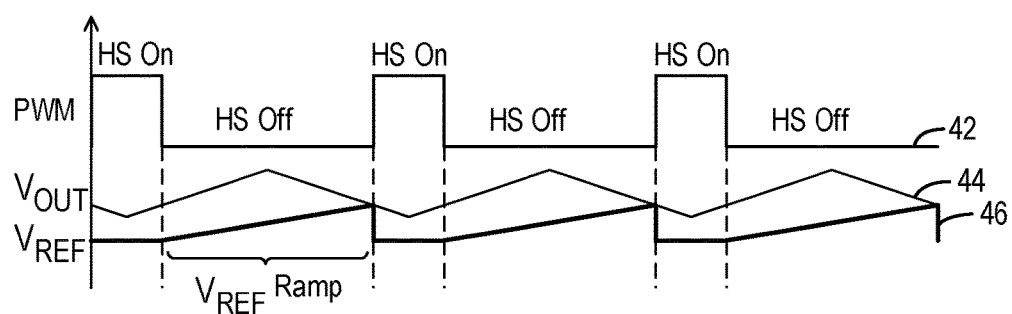
FIG. 2(a)
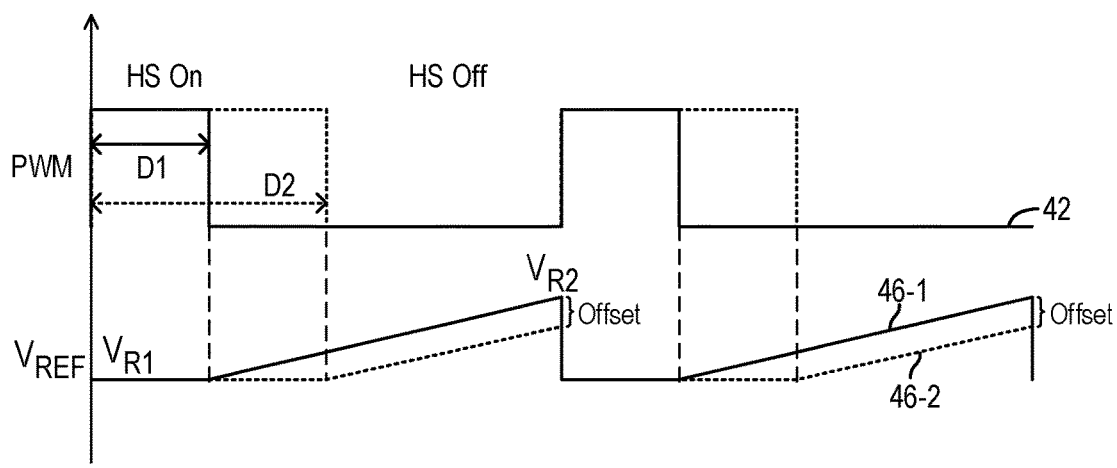
FIG. 2(b)
Fig. 2
(Prior Art)

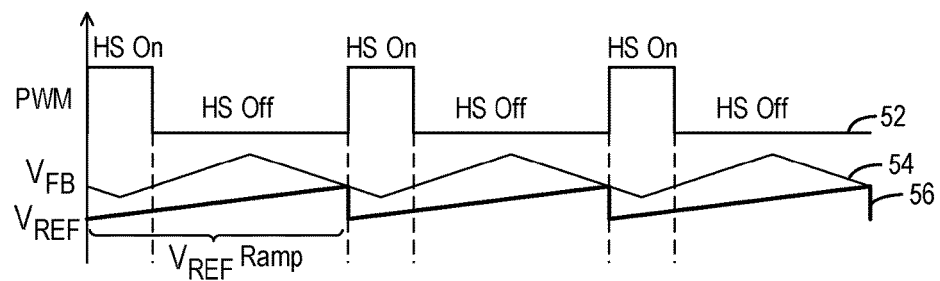
FIG. 4(a)
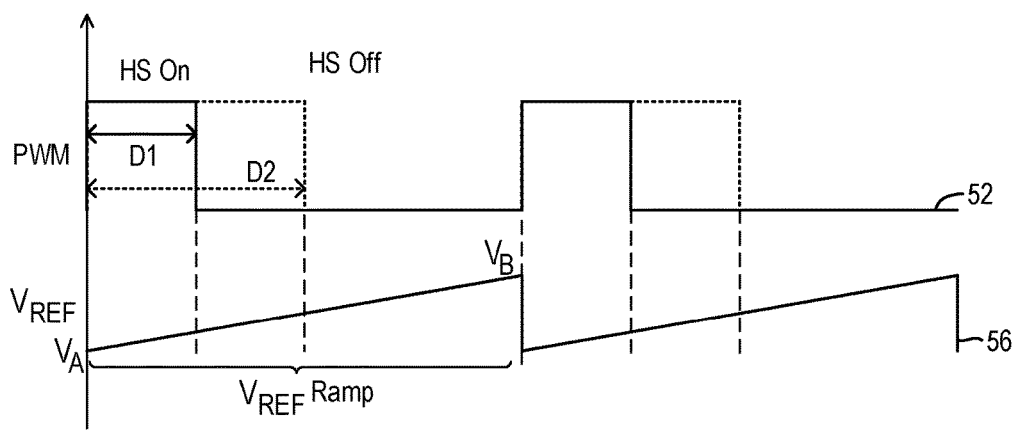
FIG. 4(b)
Fig. 4

US 10,056,822 B1

CONSTANT ON-TIME SWITCHING REGULATOR FOR ZERO ESR OUTPUT CAPACITOR WITHOUT OUTPUT VOLTAGE OFFSET

FIELD OF THE INVENTION

The invention relates to switching regulators or DC-to-DC converters and, in particular, to a switching regulator implementing fixed frequency constant on-time control with a reference voltage ramp to enable the switching regulator to be coupled to an output capacitor having any value of equivalent series resistance.

BACKGROUND OF THE INVENTION

Switch mode power supplies or switching regulators, also referred to as DC to DC converters, are used to convert an input supply voltage to a desired output voltage at a voltage level appropriate for integrated circuits in an electronic system. For example, a 12 volts supply voltage provided to an electronic system may need to be reduced to 5 volts for supplying the I/O interface circuits and reduced to 1V for supplying the core digital logic circuits. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional switching regulator is well known and is generalized as follows. A power switch is turned on periodically to apply energy to an inductor of an output filter circuit to allow the current through the inductor to build up. When the power switch is turned off, the voltage across the inductor reverses and charges are transferred onto an output capacitor of the output filter circuit and the load. A relatively constant output voltage is maintained by the output capacitor. A second power switch, sometimes called a synchronous rectifier, is sometimes used for synchronous control operation. In general, the main power switch, also referred to as the high-side switch, is turned on while the second power switch, referred to as the low-side switch, is turned off, and vice versa.

Switching regulators include a control circuit which typically uses an error amplifier to compare a feedback voltage indicative of the output voltage with a reference voltage and the control circuit generates one or more control signals that control the switching frequency (pulse frequency modulation) or the pulse width (pulse width modulation) of the on-off switching cycle. Many different control schemes have been applied to control the duty cycle (i.e., the on-time) of the main power switch. A constant on-time (or fixed on-time) control scheme is one type of control schemes where the on-time of the main power switch of the switching regulator is kept constant and the off time of the main power switch is varied to generate the desired output voltage. Constant on-time control scheme is preferred in the industry for some important advantages, such as good light load efficiency and faster transient response.

FIG. 1 is a schematic diagram of a conventional switching regulator implementing a constant on-time control scheme. In switching regulator 10, a main power switch M1 and a second power switch M2 are connected in series between the input voltage $V_{IN}$ (node 12) and the ground potential. Power switch M1 operates to switch the input voltage $V_{IN}$ to an inductor L1 periodically to charge inductor L1. When the main power switch is turned off, the energy stored in the inductor L1 is transferred to an output capacitor $C_{OUT}$ and a load 18 and a substantially constant output voltage $V_{OUT}$ is maintained. The inductor L1 and the output capacitor $C_{OUT}$ form a low-pass filter. The second power switch M2 is used to realize synchronous rectification and is driven by the inverse of the drive signal (node 32) driving the main power switch M1. Thus, the low-side power switch M2 is turned on when the main power switch M1 is turned off and vice versa.

A regulator control circuit is configured to drive the power switches M1 and M2 according to a constant on-time control scheme. In operation, the main power switch M1 is turned on for a fixed time duration as determined by a one-shot timer 26 and switch M1 is then turned off. The output voltage $V_{OUT}$ (node 16) is monitored through a feedback loop. More specifically, the output voltage $V_{OUT}$ is fed back to the regulator control circuit as a feedback voltage $V_{FB}$. The feedback voltage $V_{FB}$ is compared with a reference voltage $V_{REF}$ at a voltage comparator 22. The output of the voltage comparator 22 is gated with the output of a minimum off-time timer 30 at an AND logic gate 24. After the main power switch M1 has been turned off for at least the minimum off-time, when the output voltage $V_{OUT}$ decreases below the reference voltage $V_{REF}$, AND gate 24 will trigger the one-shot timer 26 to turn on the main power switch M1 again for the fixed on-time duration. The conventional switching regulator 10 realizes fast transient response and high efficiency at light load condition.

Fixed on-time (or constant on-time) regulators are one type of voltage regulators employing ripple-mode control. In general, ripple-mode regulators regulate their output voltage based on the ripple component in the output signal. Because of the switching action at the power switches, all switch-mode regulators generate an output ripple current through the switched output inductor. This current ripple manifests itself as an output voltage ripple due, principally, to the equivalent series resistance (ESR) in the output capacitor placed in parallel with the load.

For voltage regulators using ripple-mode control, while the output ripple is useful in output voltage regulation, it is undesirable in terms of output signal noise and load voltage limits. Indeed, the desire to minimize output ripple has lead to design and production of capacitors having very low ESR. Lowering output capacitor ESR can significantly lower the output ripple signal. Low ripple serves the interests of noise minimization and reduced load voltage variation, but makes ripple-mode regulation more difficult. Low ripple magnitude reduces the comparator voltage differentials, making accurate and fast comparison very difficult.

To that end, manufacturers of fixed on-time voltage regulators often impose a minimum ESR for the output capacitor to ensure a minimum amount of ripple voltage at the output voltage so that effective ripple-mode control can be realized. Thus, an output capacitor with a large ESR has to be used with all fixed on-time voltage regulators. In some cases, when the output capacitor itself does not have enough ESR, manufacturers suggest including a resistor in series with the output capacitor to introduce enough series resistance to generate the required minimum amount of ripple voltage.

The requirement of a minimum amount of ripple voltage at the output signals limits the application of fixed on-time voltage regulators to cases where ripples in the output voltage can be tolerated. Also, zero ESR capacitors, such as ceramic capacitors, which are usually cheaper than tantalum capacitors having large ESR, cannot be used because a minimum amount of ESR is required for proper control loop operation.

Solutions to enable a fixed on-time voltage regulator to use a low ESR output capacitor have been proposed. For example, in some cases, a virtual ripple generator is used to generate an internal virtual ripple proportional with the inductor current. While these solutions allow for the use of low ESR capacitor in ripple-mode voltage regulators, these solutions add complexity and cost to the voltage regulators.

In another example, a buck voltage regulator varies the reference voltage within a pulse width modulation (PWM) cycle to generate the PWM signal. FIG. 2, which includes FIGS. 2(a) and 2(b), illustrates the signal waveforms for a buck voltage regulator using a voltage ramp in one example. In particular, the reference voltage is maintained at a low fixed value when the main power switch is conducting and then the reference voltage is ramped up during the off-time of the main power switch to a final value, as shown in FIG. 2(a). While this type of voltage ramp is capable of providing compensation to the feedback control loop of the voltage regulator, the voltage ramp for different output voltages will have different final voltage values so that a voltage offset results for different output voltages, as shown in FIG. 2(b). For different output voltages, the voltage regulator will be operated at different duty cycle and the off-time of the main switch varies. As a result, the voltage ramp will have different final voltage values for different output voltages. The voltage offset between different output voltages causes manufacturers to require the user to modify the fixed reference voltage value based on the output voltage selected. This type of ad-hoc user modification is inconvenient and a burden to the user.

BRIEF DESCRIPTION OF THE DRAWINGS

Various embodiments of the invention are disclosed in the following detailed description and the accompanying drawings.

FIG. 2, which includes FIGS. 2(a) and 2(b), illustrates the signal waveforms for a buck voltage regulator using a voltage ramp in one example.

FIG. 4, which includes FIGS. 4(a) and 4(b), illustrates the signal waveforms for a switching regulator incorporating a reference ramp generator in embodiments of the present invention.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In accordance with the principles of the present invention, a control circuit for a switching regulator implementing a fixed frequency constant on-time control scheme incorporates a reference voltage generator to generate a reference voltage ramp that varies over substantially the entire switching period. In one embodiment, the reference voltage increases from an initial voltage value at the start of each switching period towards the end of the switching period and is reset to the initial voltage value at the end of each switching period. Based on the fixed frequency constant on-time control scheme, the charge period for the reference voltage ramp will be the same for all duty cycle or all output voltage values. Therefore, regardless of the output voltage selected or the duty cycle being used, the control circuit ensures stable feedback control operation in the switching regulator without introducing voltage offset. The reference voltage generator generating the reference voltage ramp enables the switching regulator to apply constant on-time control scheme while using an output capacitor having any equivalent series resistance (ESR) value, including an output capacitor with low or zero ESR, such as less than 30 milli-ohms.

Figure 1:
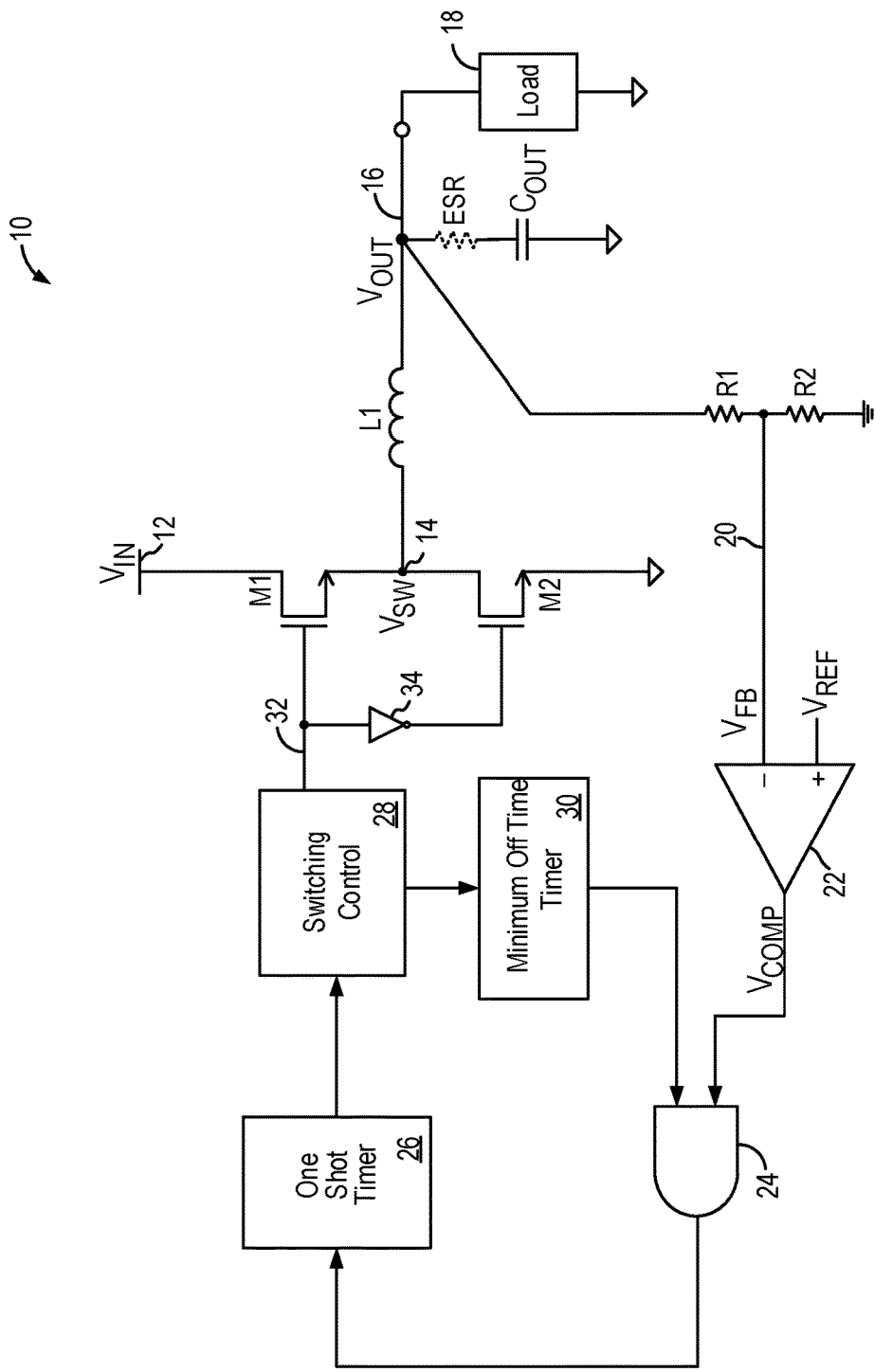
FIG. 1 is a schematic diagram of a conventional switching regulator implementing a constant on-time control scheme.
Figure 3:
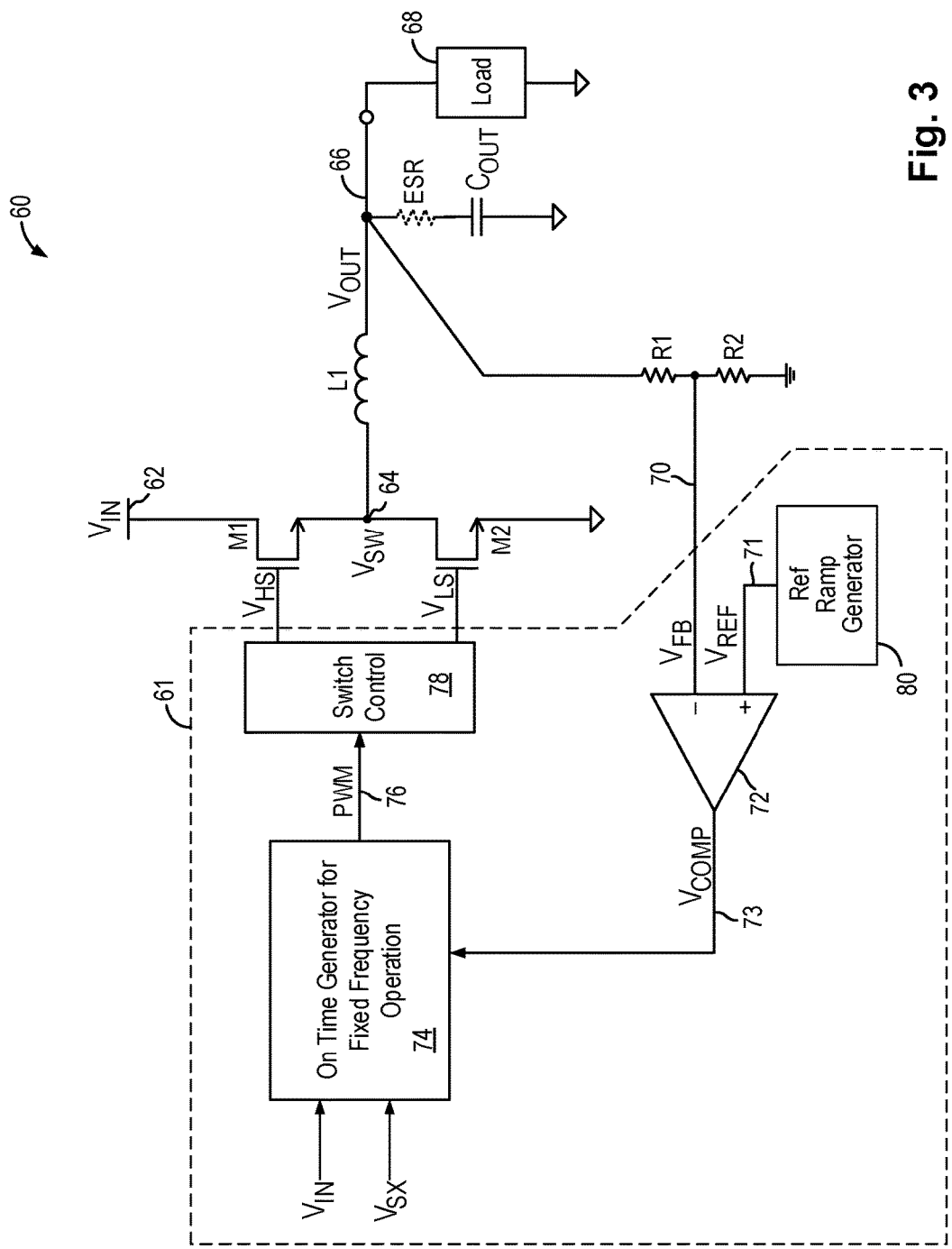
FIG. 3 is a schematic diagram of a switching regulator including a control circuit implementing a fixed frequency constant on-time control scheme and incorporating a reference ramp generating circuit according to embodiments of the present invention.

FIG. 3 is a schematic diagram of a switching regulator including a control circuit implementing a fixed frequency constant on-time control scheme and incorporating a reference ramp generating circuit according to embodiments of the present invention. Referring to FIG. 3, a switching regulator 60 includes a regulator control circuit 61 driving a high-side power switch M1 and a low-side power switch M2 connected in series between the input voltage $V_{IN}$ (node 12) and ground. In the present embodiment, power switches M1 and M2 are both NMOS transistor and the low-side power switch M2 is controlled by a gate drive signal $V_{LS}$ being the inverse of a gate drive signal $V_{HS}$ driving the high-side power switch M1. In operation, the low-side power switch M2 is turned on when the high-side power switch M1 is turned off and vice versa. The power switches M1 and M2 are turned on and off alternately to generate a switching voltage $V_{SW}$ on a common node 64. The switching voltage $V_{SW}$ at node 64 drives an output LC filter circuit formed by an inductor L1 and an output capacitor $C_{OUT}$. The output LC filter circuit generates a DC output voltage $V_{OUT}$ at an output voltage node 66 having substantially constant magnitude. In operation, the output voltage $V_{OUT}$ is coupled to drive a load 68.

The output capacitor $C_{OUT}$ has associated with it a certain amount of ESR, as represented by the dotted-line resistance ESR connected in series with the output capacitor. When an output capacitor with zero ESR is used, resistance ESR has zero resistance and is therefore a short circuit. In embodiments of the present invention, the switching regulator 60 can be implemented using output capacitance $C_{OUT}$ having any amount of ESR, including an output capacitor with low or zero ESR, such as less than 30 milli-ohms. Accordingly, in some embodiments, a zero-ESR capacitor, such as a ceramic capacitor, can be used as the output capacitor $C_{OUT}$ so that the ripple voltage at the output voltage $V_{OUT}$ is minimized.

The regulator control circuit 61 is configured to drive the high-side power switch M1 and the low-side power switch M2 based on a fixed frequency constant on-time control scheme. In the present description, fixed frequency control on-time control refers to a control scheme where the switching period or the switching frequency is fixed even when the input voltage $V_{IN}$ or the output voltage $V_{OUT}$ changes. Under the fixed frequency constant on-time control scheme, the turn-on time of the high-side power switch M1 is determined by the input voltage $V_{IN}$ and the average value of the switching voltage $V_{SW}$, referred to as voltage Vsx. Circuits and methods to implement the fixed frequency constant on-time control scheme are known in the art. An example of an implementation of the fixed frequency constant on-time control scheme will be described below with reference to FIG. 6. Under the fixed frequency constant on-time control scheme, the switching frequency of the power switches, or the switching period, remains the same for different output voltage levels. That is, regardless of the output voltage selected, the switching period for power switches M1 and M2 is the same. The regulator control circuit 61 controls the duty cycle, or the on-time, of the high-side power switch in response to the selected output voltage level. More specifically, the regulator control circuit 61 controls the duty cycle, or the on-time, of the high-side power switch in response to the ratio of the input voltage to the selected output voltage level.

In the present embodiment, the regulator control circuit 61 includes an On time generating circuit 74 (also referred to as "On time Generator") to generate a control signal for a switch control circuit 78 which generates the gate drive signals $V_{HS}$ and $V_{LS}$ for turning on or off the high-side switch M1 and the low-side switch M2, respectively. In the present embodiment, the On Time Generator generates a pulse-wide modulation (PWM) signal having a fixed switching frequency or fixed switching period and having a given duty cycle, or on time, for turning on the high-side switch M1.

To regulate the output voltage $V_{OUT}$ at the output node 66, the regulator control circuit 61 implements a feedback control loop where the output voltage $V_{OUT}$ (node 66) is coupled back to the regulator control circuit 61 as a feedback voltage $V_{FB}$ (node 70). In the present embodiment, the feedback voltage $V_{FB}$ is a divided down voltage of the output voltage $V_{OUT}$. A voltage divider formed by serially connected resistors R1 and R2 is used to divide down the output voltage $V_{OUT}$ to generate the feedback voltage $V_{FB}$.

The feedback voltage $V_{FB}$ is coupled to a comparator 72 to be compared with a reference voltage $V_{REF}$ (node 71). The comparator output signal $V_{COMP}$ (node 73) of the comparator 72 is deasserted when the feedback voltage $V_{FB}$ is greater than the reference voltage $V_{REF}$ and the comparator output signal $V_{COMP}$ is asserted when the feedback voltage $V_{FB}$ is equal to or drops below the reference voltage $V_{REF}$. The comparator output signal $V_{COMP}$ is coupled to the On Time Generator 74 which generates the PWM signal in response to the comparator output signal $V_{COMP}$. In some embodiments, the On Time Generator 74 generates the PWM signal in response to the comparator output signal $V_{COMP}$, the input voltage $V_{IN}$, and a voltage $V_{SX}$, being an average voltage value of the switching output voltage $V_{SW}$. The feedback control loop thus operates to regulate the output voltage $V_{OUT}$ through the fixed frequency constant on-time control scheme where the high-side power switch is turned on for an on-time duration determined by $V_{IN}$ and $V_{SX}$, as will be explained below with reference to FIG. 6.

In embodiments of the present invention, the reference voltage $V_{REF}$ is a voltage ramp that varies from a starting voltage value to an ending voltage value over the switching period of the fixed frequency constant on time control scheme. To that end, the regulator control circuit 61 includes a reference ramp generating circuit 80 to generate the reference voltage ramp to be used as the reference voltage $V_{REF}$. The reference ramp generating circuit 80 generates a reference voltage ramp that varies over substantially the entire switching period of the switching regulator. Thus, the reference voltage ramp is the same regardless of the output voltage value or the duty cycle of the switching regulator. The reference ramp generating circuit 80 generates the reference voltage ramp that increases, at the beginning of each switching period, from the starting voltage value being the desired reference voltage value or an initial reference voltage value towards the ending voltage value near the end of each switching period. Accordingly, the reference voltage ramp varies while the high-side switch is turned on and also while the high-side switch is turned off. The reference voltage ramp is reset at the end of each switching period to the starting voltage value. In some embodiments, the reference voltage ramp increases linearly within the switching period.

FIG. 4, which includes FIGS. 4(a) and 4(b), illustrates the signal waveforms for a switching regulator incorporating a reference ramp generator in embodiments of the present invention. Referring to FIG. 4(a), the PWM signal (curve 52) controls the high-side switch M1 (HS) to turn on and off during each switching period and accordingly controls the low-side switch M2 to turn off and on alternately. A switching period is defined by the time duration between the start of two adjacent on duration of the high-side switch. Alternately, a switching period can be defined by the time duration between two adjacent low-to-high transition of the PWM signal for an active high PWM signal. The feedback voltage $V_{FB}$ (curve 54) is indicative of the output voltage $V_{OUT}$ and may have a small ripple component and a phase lag. In embodiments of the present invention, the reference voltage $V_{REF}$ (curve 56) is provided as a reference voltage ramp that varies over the switching period. That is, the reference voltage ramp has a voltage value that varies during the on duration of the high-side switch and during the off duration of the high-side switch.

FIG. 4(b) illustrates the reference voltage ramp for different duty cycle of the high-side switch when different output voltage is selected. In the present embodiment, the reference voltage ramp increases from a starting voltage value $V_A$ at the start of a switching period towards an ending voltage value $V_B$ near the end of the switching period and is reset to the initial voltage value $V_A$ at the end of the switching period. Because the reference voltage ramp increases for nearly the entire switching period, the reference voltage ramp has the same ending voltage value of $V_B$ regardless of the duty cycle of the high-side switch. Furthermore, with the use of the fixed frequency constant on time control scheme, the reference voltage ramp is the same for all output voltage values because the voltage increase time for the voltage ramp is the same for all output voltage values. No voltage offset in the reference voltage results even when the duty cycle or the output voltage value changes. Accordingly, when the reference ramp generating circuit 80 is applied in the switching regulator 60, the switching regulator can be configured for use with a wide range of output voltage values without requiring the user to adjust the reference voltage, being the initial reference voltage value of the reference voltage ramp.

Figure 5:
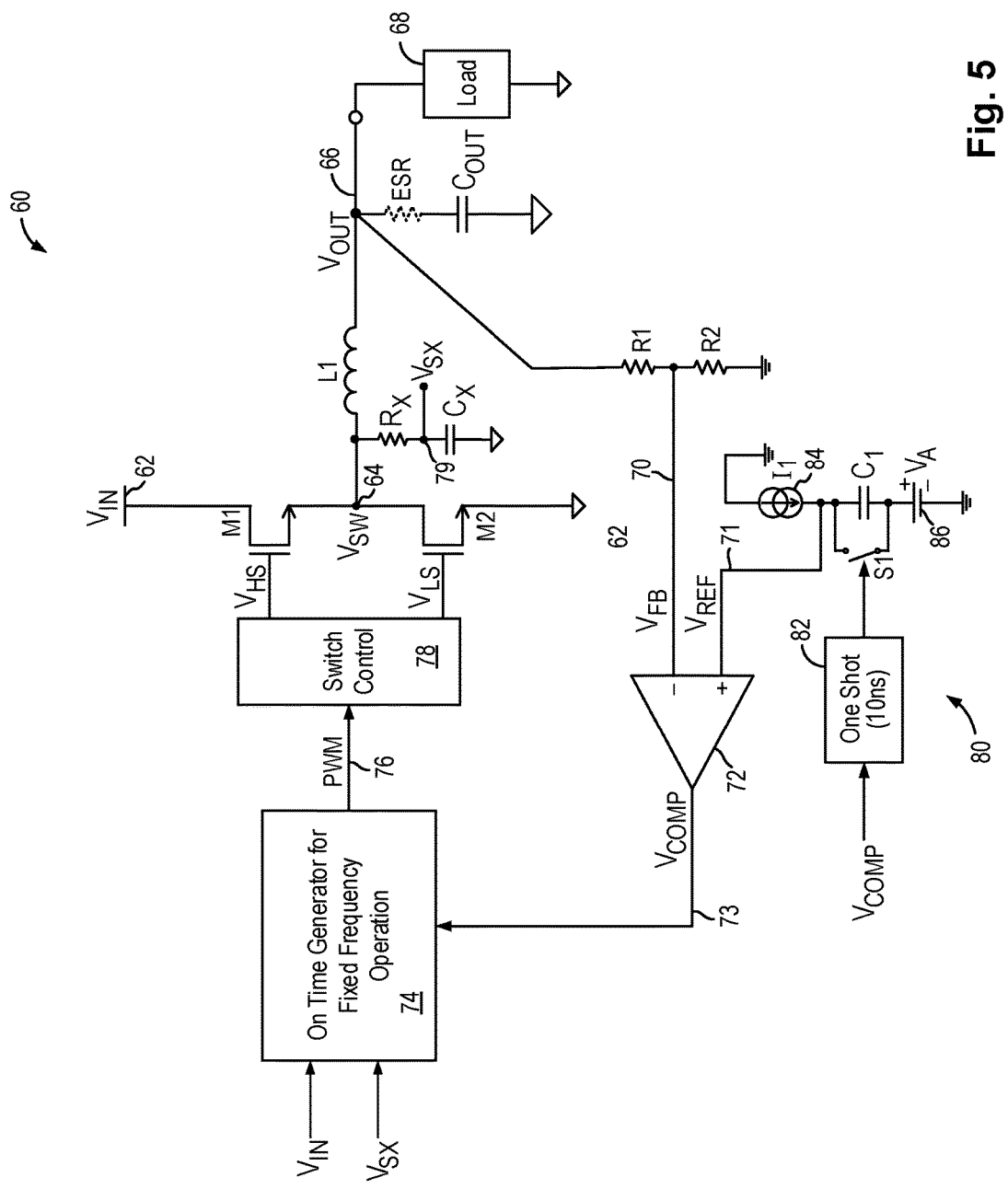
FIG. 5 is a schematic diagram of the switching regulator of FIG. 3 illustrating an implementation of the reference ramp generating circuit according to embodiments of the present invention.

FIG. 5 is a schematic diagram of the switching regulator of FIG. 3 illustrating an implementation of the reference ramp generating circuit according to embodiments of the present invention. Referring to FIG. 5, in the present embodiment, the reference ramp generating circuit 80 includes a voltage source 86 providing a voltage $V_A$ being the initial reference voltage value and a current source 84 providing a current $I_1$. A capacitor $C_1$ is connected between the current source 84 and the voltage source 86. In particular, the capacitor $C_1$ has a first plate coupled to the current source 84 and a second plate coupled to the voltage source 86. A switch S1 is coupled across the capacitor $C_1$. The switch S1 is controlled by a switch control signal generated by a one-shot circuit 82. The one-shot circuit 82 generates a one-shot signal having a predetermined duration in response to the comparator output signal $V_{COMP}$. The one-shot signal is coupled to the switch S1 as the switch control signal. The first plate (node 71) of the capacitor $C_1$ provides the voltage ramp of the reference voltage $V_{REF}$.

In operation, the comparator output signal $V_{COMP}$ is asserted, or transition to a logical high, at the boundary of each switching period. The boundary of each switching period refers to the end of one switching period and the start of the next switching period. In response to the comparator output signal $V_{COMP}$ being asserted, the one-shot signal is activated at the end of a switching period to close the switch S1 to quickly discharge the capacitor $C_1$. In some embodiments, the one-shot signal has a duration of 10 ns or less for a switching period having a duration of 1000 ns. With the switch S1 closed, the top plate and the bottom plate of capacitor $C_1$ are biased to the DC voltage $V_A$. Thus, the reference voltage $V_{REF}$ (node 71) is biased to the starting voltage value $V_A$. After the one-shot duration expires, the switch S1 is open. The next switching period continues and the current source 84 charges the capacitor $C_1$ so that the reference voltage $V_{REF}$ at the top plate of the capacitor $C_1$ increases. As a result, the reference voltage $V_{REF}$ is provided as a reference voltage ramp increasing from the starting voltage value $V_A$ at the start of each switching period towards the ending voltage $V_B$ near the end of each switching period. The current source $I_1$ provides a current for charging the capacitor $C_1$ from the starting voltage $V_A$ to the ending voltage $V_B$. At the end of the switching period, the comparator output signal $V_{COMP}$ is asserted to trigger the one-shot circuit 82 and the switch S1 is closed again to discharge the capacitor $C_1$. The reference voltage ramp is thus reset, and the reference voltage ramp is generated again over the next switching period.

FIG. 5 illustrates one implementation of the reference ramp generating circuit 80 which can be used to generate the reference voltage ramp of FIG. 4. The reference ramp generating circuit 80 shown in FIG. 5 is illustrative only and not intended to be limiting. In other embodiments, the reference ramp generating circuit 80 can be implemented using other circuitry to generate a reference voltage ramp that varies over each switching period, as described above and shown in FIG. 4.

Figure 6:
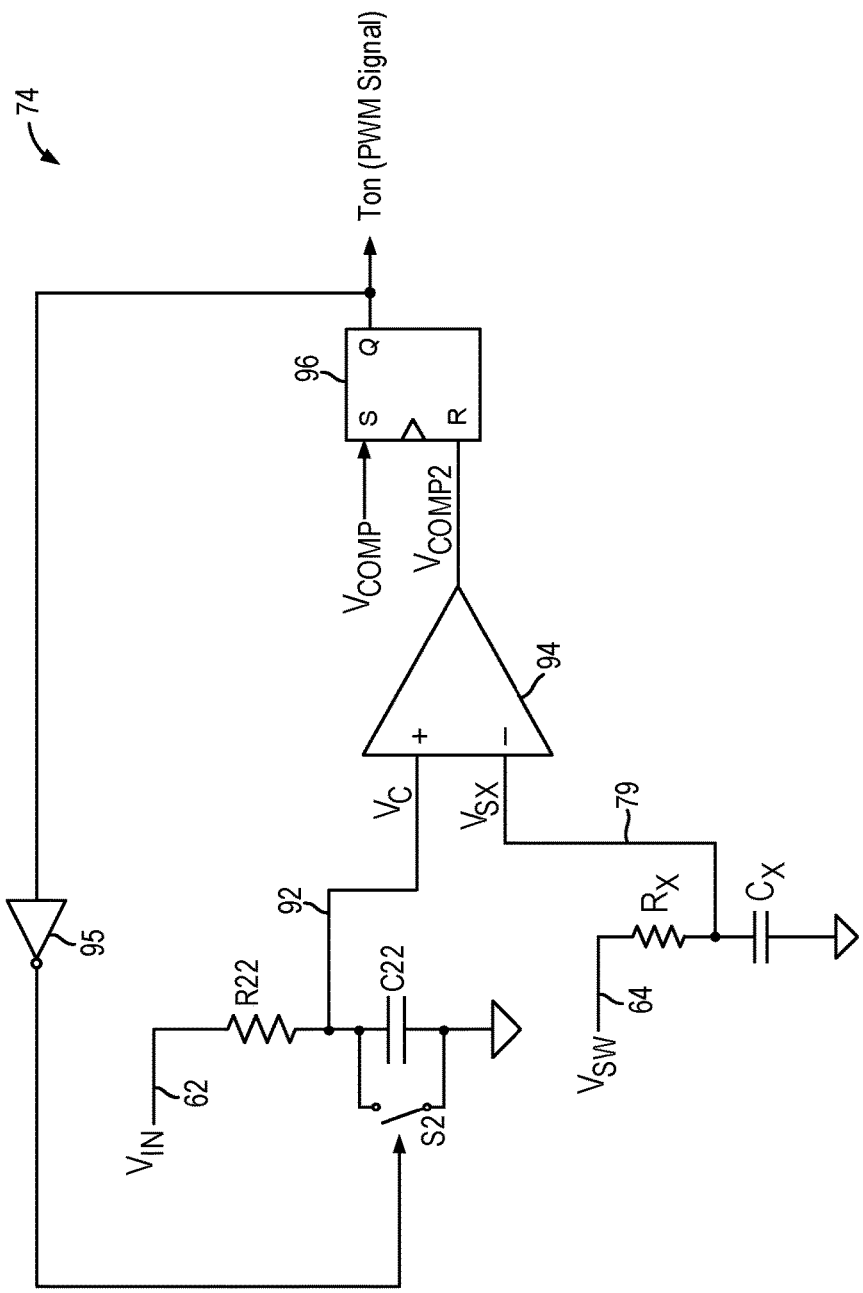
FIG. 6 is a schematic diagram illustrating the implemented of the On time generating circuit in some embodiments.

FIG. 6 is a schematic diagram illustrating the implemented of the On time generating circuit in some embodiments. Referring to FIG. 6, the On time generating circuit 74 generates the PWM signal under the fixed frequency constant on time operation. The On time generating circuit 74 receives the input voltage $V_{IN}$ and the average voltage $V_{SX}$ (node 79) indicative of the switching output voltage $V_{SW}$. There are many ways to generate the average voltage Vsx from the switching voltage Vsw. In the present embodiment, an RC filter is used to generate the average voltage $V_{SX}$ from the switching voltage $V_{SW}$. In particular, the RC filter includes a resistor $R_X$ connected in series with a capacitor $C_X$ between the switching output voltage $V_{SW}$ (node 64) and ground. The common node 79 is the average voltage $V_{SX}$.

Meanwhile, the input voltage $V_{IN}$ is coupled to a serially connected resistor R22 and capacitor C22. A switch S2 is connected across the capacitor C22 and is controlled by the inverse of the PWM signal (Ton) to open and close the switch. The input voltage $V_{IN}$ (node 62) charges the capacitor C22 through the resistor R22 and a voltage $V_C$ is generated at the common node 92. The voltage $V_C$ and the voltage $V_{SX}$ are coupled to a comparator 94 which generates the comparator output signal $V_{COMP2}$. The comparator output signal $V_{COMP2}$ is coupled to the reset terminal (R) of a Flip-Flop 96. The comparator output signal $V_{COMP}$, from comparator 72 (FIG. 5) of the feedback control loop, is coupled to the set terminal (S) of the Flip-Flop 96. The output (Q) of the Flip-Flop 96 is the PWM signal indicative of the on time (Ton) of the high-side switch. The PWM signal is connected to an inverter 95 and the inverted PWM signal is then coupled to drive switch S2 connected across the capacitor C22.

In operation, at the start of each switching period, the comparator output signal $V_{COMP}$ is at a logical high to set the Q output of the Flip-Flop 96 (e.g. logical high) and the on time signal Ton (the PWM signal) is asserted to turn on the high-side power switch M1. At the same time, the switch S2 is open and capacitor C22 is charged by the input voltage $V_{IN}$ through the resistor R22 and the voltage $V_C$ increases. The voltage $V_C$ is compared to voltage $V_{SX}$ at the comparator 94 as the voltage $V_C$ is being charged up by the input voltage $V_{IN}$.

In response to the voltage $V_C$ being higher than the average voltage $V_{SX}$, the comparator output signal $V_{COMP2}$ is asserted (e.g. logical high) to reset the Q output of the Flip-Flop 96 (e.g. to logical low). The on time signal Ton (the PWM signal) is deasserted and the on-time is stopped. Meanwhile, the on time signal Ton is inverted and coupled to switch S2 to cause switch S2 to close. With switch S2 closed, the capacitor C22 is discharged and the voltage $V_C$ is reset to the ground voltage. The switch S2 remains closed until the comparator output signal $V_{COMP}$ is asserted (e.g. logical high) to start the next switching period. At the start of the next switching period, the on time signal Ton (Q output of the Flip-Flop 96) is set (e.g. logical high) by the comparator output signal $V_{COMP}$ and the switch S2 is open to allow the capacitor C22 to be charged again by the input voltage $V_{IN}$.

If the voltage $V_C$ is small, the charge current of capacitor C22 can be approximated as Vin/R22. If $R_X*C_X$ is at least ten times larger than $L1*C_{OUT}$ of the low pass filter, then the voltage across capacitor $C_X$ is equal to the output voltage $V_{OUT}$. That is, the RC filter of resistor $R_X$ and $C_X$ generates the average voltage value of the switching output voltage $V_{SW}$ as the voltage $V_{SX}$, the average voltage value being the output voltage $V_{OUT}$.

If Ton=$T*V_{OUT}/V_{IN}$, where T is the constant and equal to the switching period, then fixed frequency constant on-time control can be realized. There are many ways to generate Ton=$T*V_{OUT}/V_{IN}$. FIG. 6 illustrates one way to generate the fixed frequency on-time control. In particular, the time that is needed to charge the capacitor C22 to the voltage Vsx is equal to t=Vsx*R22*C22/Vin, assuming the charge current equals to Vin/R22. So, if t, the time needed to charge the capacitor C22 to voltage Vsx, is set to Ton, the switching period is fixed as R22*C22, and thus the switching frequency is fixed as 1/(R22*C22), with the charge current being assumed to be equal to Vin/R22. More specifically, the on-time Ton can be given as:

$$Ton*(V_{IN}/R22)=C22*V_{OUT}, \text{ and}$$

$$Ton=R22*C22*V_{OUT}/V_{IN}.$$

The On time generating circuit 74 realizes fixed frequency by using a constant on-time Ton modulated by Vin and Vsw with fixed frequency Fsw=1/(R22*C22).

FIG. 6 illustrates one implementation of the On time generating circuit 74 which can be used to generate the PWM signal for controlling the high-side switch M1 and the low-side switch M2. The On time generating circuit 74 shown in FIG. 6 is illustrative only and not intended to be limiting. In other embodiments, the On time generating circuit 74 can be implemented using other circuitry to generate the PWM signal under the fixed frequency constant on time control scheme, as described above.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A control circuit for a switching regulator receiving an input voltage, the control circuit controlling a high-side switch and a low-side switch using a fixed frequency constant on-time control scheme to drive a switch output node for generating a switching output voltage, the switch output node being coupled to an LC filter circuit to generate a regulated output voltage having a substantially constant magnitude on an output node, the regulated output voltage being fed back to the control circuit as a feedback voltage, the control circuit comprising:
a reference ramp generating circuit configured to receive a first reference voltage and to generate a reference voltage ramp which varies over a switching period determined by the fixed frequency constant on-time control scheme from a starting voltage value being the first reference voltage to an ending voltage value; and
control circuitry configured to generate a pulse-wide modulation (PWM) signal having the switching period and having a duty cycle indicative of the voltage value of the regulated output voltage, the PWM signal being coupled to control the high-side switch and the low-side switch to turn on and off alternately over the switching period, the high-side switch being turned on for the duty cycle and turned off for the remaining switching period and the low-side switch being turned off and on alternately, the control circuit generating the PWM signal in response to a comparator output signal comparing the feedback voltage indicative of the regulated output voltage to the reference voltage ramp.

2. The control circuit of claim 1, wherein the reference voltage ramp has the same ending voltage value for different duty cycle values of the high-side switch indicative of different regulated output voltage values.

3. The control circuit of claim 1, further comprising:
a switch control circuit configured to receive the pulse-wide modulation (PWM) signal having the switching period determined by the fixed frequency constant on-time control scheme and having the duty cycle indicative of the voltage value of the regulated output voltage, the switch control circuit generating gate drive signals to control the high-side switch and the low-side switch to turn on and off alternately over the switching period, the high-side switch being turned on for the duty cycle and turned off for the remaining switching period and the low-side switch being turned off and on alternately;
a comparator configured to receive the feedback voltage indicative of the regulated output voltage and the reference voltage ramp generated by the reference ramp generating circuit, the comparator generating the comparator output signal being deasserted in response to the feedback voltage being greater than the reference voltage ramp and being asserted in response to the feedback voltage being equal to or less than the reference voltage ramp; and
an on-time generating circuit configured to generate the PWM signal under the fixed frequency constant on-time control scheme in response to at least the comparator output signal.

4. The control circuit of claim 1, wherein the reference ramp generating circuit is configured to generate the reference voltage ramp having an increasing voltage value from the starting voltage value at the start of each switching period towards the ending voltage value near the end of each switching period, the reference voltage ramp being reset to the first reference voltage at the end of each switching period.

5. The control circuit of claim 4, wherein the reference voltage ramp increases linearly from the starting voltage value to the ending voltage value.

6. The control circuit of claim 4, wherein the reference voltage ramp is discharged to the first reference voltage at the end of each switching period.

7. The control circuit of claim 1, wherein the reference ramp generating circuit comprises:
a voltage source providing the first reference voltage;
a current source providing a first current;
a first capacitor having a first plate coupled to the current source and a second plate coupled to the voltage source, the first plate of the first capacitor providing the reference voltage ramp;
a switch coupled across the first capacitor and controlled by a switch control signal; and
a one-shot circuit configured to generate a one-shot signal having a predetermined duration in response to the comparator output signal, the one-shot signal being coupled to the switch as the switch control signal to close the switch for the predetermined duration to discharge the capacitor at the end of each switching period and to open the switch for the remainder of the switching period.

8. The control circuit of claim 7, wherein the one-shot signal has a predetermined duration of 10 ns or less.

9. The control circuit of claim 7, wherein the current source provides the first current having a current value to charge the first capacitor to the ending voltage value near the end of each switching period.

10. The control circuit of claim 1, wherein the feedback voltage comprises a divided down voltage of the regulated output voltage.

11. A switching regulator being configured to receive an input voltage and to generate a regulated output voltage, the switching regulator controlling a high-side switch and a low-side switch based on a feedback control scheme to drive a switch output node for generating a switching output voltage, the switch output node being coupled to an LC filter to generate the regulated output voltage having a substantially constant magnitude on an output node, the switching regulator comprising:
a control circuit configured to generate a pulse-wide modulation (PWM) signal having a switching period determined by a fixed frequency constant on-time control scheme and having a duty cycle indicative of the voltage value of the regulated output voltage, the PWM signal being coupled to control the high-side switch and the low-side switch to turn on and off alternately over the switching period, the high-side switch being turned on for the duty cycle and turned off for the remaining switching period and the low-side switch being turned off and on alternately, the control circuit generating the PWM signal in response to a comparator output signal comparing a feedback voltage indicative of the regulated output voltage to a reference voltage ramp, the reference voltage ramp having a voltage value that varies over the switching period from a starting voltage value to an ending voltage value.

12. The switching regulator of claim 11, wherein the reference voltage ramp has the same ending voltage value for different duty cycle values of the high-side switch indicative of different regulated output voltage values.

13. The switching regulator of claim 11, wherein the LC filter circuit includes a first inductor and an output capacitor, and the output capacitor has a small or zero equivalent series resistance (ESR) value.

14. The switching regulator of claim 11, wherein the control circuit comprises:
a switch control circuit configured to receive the PWM signal having the switching period determined by the fixed frequency constant on-time control scheme and having the duty cycle indicative of the voltage value of the regulated output voltage, the switch control circuit generating gate drive signals to control the high-side switch and the low-side switch to turn on and off alternately over the switching period, the high-side switch being turned on for the duty cycle and turned off for the remaining switching period and the low-side switch being turned off and on alternately;
a reference ramp generating circuit configured to receive a first reference voltage and to generate the reference voltage ramp which varies over the switching period from the starting voltage value being the first reference voltage to the ending voltage value;
a comparator configured to receive the feedback voltage indicative of the regulated output voltage and the reference voltage ramp generated by the reference ramp generating circuit, the comparator generating the comparator output signal being deasserted in response to the feedback voltage being greater than the reference voltage ramp and being asserted in response to the feedback voltage being equal to or less than the reference voltage ramp; and
an on-time generating circuit configured to generate the PWM signal under the fixed frequency constant on-time control scheme in response to at least the comparator output signal.

15. The switching regulator of claim 14, wherein the reference ramp generating circuit is configured to generate the reference voltage ramp having an increasing voltage value from the starting voltage value at the start of each switching period towards the ending voltage value near the end of each switching period, the reference voltage ramp being reset to the first reference voltage at the end of each switching period.

16. The switching regulator of claim 15, wherein the reference voltage ramp increases linearly from the starting voltage value to the ending voltage value.

17. The switching regulator of claim 15, wherein the reference voltage ramp is discharged to the first reference voltage at the end of each switching period.

18. The switching regulator of claim 14, wherein the reference ramp generating circuit comprises:
a voltage source providing the first reference voltage;
a current source providing a first current;
a first capacitor having a first plate coupled to the current source and a second plate coupled to the voltage source, the first plate of the first capacitor providing the reference voltage ramp;
a switch coupled across the first capacitor and controlled by a switch control signal; and
a one-shot circuit configured to generate a one-shot signal having a predetermined duration in response to the comparator output signal, the one-shot signal being coupled to the switch as the switch control signal to close the switch for the predetermined duration to discharge the capacitor at the end of each switching period and to open the switch for the remainder of the switching period.

19. The switching regulator of claim 18, wherein the one-shot signal has a predetermined duration of 10 ns or less.

20. The switching regulator of claim 18, wherein the current source provides the first current having a current value to charge the first capacitor to the ending voltage value near the end of each switching period.

21. The switching regulator of claim 11, wherein the feedback voltage comprises a divided down voltage of the regulated output voltage.

22. A method in a switching regulator receiving an input voltage and generating a regulated output voltage, the switching regulator controlling a high-side switch and a low-side switch based on a feedback control scheme to drive a switch output node for generating a switching output voltage, the switch output node being coupled to an LC filter to generate the regulated output voltage having a substantially constant magnitude on an output node, the method comprising:
turning on and off the high-side switch and the low-side switch alternately in response to a pulse-wide modulation (PWM) signal having a switching period determined by a fixed frequency constant on-time control scheme and having a duty cycle indicative of the voltage value of the regulated output voltage, the high-side switch being turned on for the duty cycle and turned off for the remaining switching period and the low-side switch being turned off and on alternately; and generating the PWM signal in response to a comparator output signal comparing a feedback voltage indicative of the regulated output voltage to a reference voltage ramp, the reference voltage ramp having a voltage value that varies over the switching period from a starting voltage value to an ending voltage value.

23. The method of claim 22, further comprising:
generating the reference voltage ramp having the same ending voltage value for different duty cycle values of the high-side switch indicative of different regulated output voltage values.

24. The method of claim 23, wherein generating the reference voltage ramp comprising:
generating the reference voltage ramp having an increasing voltage value from the starting voltage value at the start of each switching period towards the ending voltage value near the end of each switching period, the reference voltage ramp being reset to the first reference voltage at the end of each switching period.

25. The method of claim 24, wherein generating the reference voltage ramp comprising:
discharging the reference voltage ramp to the first reference voltage at the end of each switching period.

\* \* \* \* \*